UNITED STATES PATENT OFFICE.

WALTER T. SCHEELE, OF HACKENSACK, NEW JERSEY, ASSIGNOR TO THE GOVERNMENT OF THE UNITED STATES, REPRESENTED BY THE SECRETARY OF THE NAVY.

INCENDIARY MIXTURE.

1,382,805.          Specification of Letters Patent.      Patented June 28, 1921.

No Drawing.     Application filed December 9, 1919.   Serial No. 343,570.

*To all whom it may concern:*

Be it known that I, WALTER T. SCHEELE, a citizen of Germany, and having made application for citizenship in the United States, and a resident of Hackensack, New Jersey, have invented new and useful Improvements in Incendiary Mixtures, of which the following is a specification.

This invention relates to an incendiary mixture for use in warfare.

An object of this invention is to provide an incendiary mixture which is voluminous, light in weight, which will produce a high temperature, for a considerable length of time, such that, materials of a more or less combustible nature may be ignited, effectively, in such a way, and in such short time interval, that the fire so started is extinguished with difficulty, and proceeds so rapidly as to effect complete destruction of the building or other works to which it may be applied.

Another object of the invention is to provide an incendiary mixture or composition of matter, which will not heat when the substances are mixed together and which will burn without a voluminous slag.

Another object of the invention is to provide a material, or composition of matter, which will burn in water, which is not unduly dangerous to handle during preparation, will not suffer deterioration or decomposition when stored in containers, or exposed to damp air for a considerable length of time, which will not lose its ignition power, and which will not be ignited when penetrated by a high velocity bullet—thus making it possible for use in aeroplanes without danger to the operators. Further, on ignition, it will produce an exceedingly voluminous and high temperatured gas flame, which is extensive as well as intensive in its action on surrounding combustibles and which lasts until the incendiary material is exhausted, and, in addition, burns without the formation of black smoke or sparks indicating complete combustion, and with an extremely brilliant long yellow flame which revolves when rising into the air. Altogether, a mixture or composition of matter well adapted for use as material in warfare, when filled into aero bombs or incendiary shells, etc.

I have discovered that I can prepare an incendiary mixture having the above mentioned properties, by mixing hexamethylenetetramin, or any of its organic or inorganic single or double salts, sodium peroxid, and paraffin wax in various proportions; the addition of the paraffin serving to regulate the speed of the reaction and prolong the effect sufficiently to insure proper ignition.

In carrying out the invention I may use hexamethylenetetramin, sodium peroxid, and paraffin wax, the latter preferably having a high melting point in the proportions illustrated in the following example:—

Hexamethylenetetramin _____ 25 parts
Sodium peroxid _____ 50 "
Paraffin wax (m. p. 43–65° C.) ____ 25 "

The hexamethylenetetramin and sodium peroxid may be finely ground separately, then thoroughly mixed, and allowed to stand for one hour, during which time, it is assumed that a reaction takes place with the resulting formation of a new substance, having the formula $C_6H_{12}N_4Na_2O_2$ (as fully described in patent application for an incendiary-oil mixture).

The finely powdered material is then slowly added with constant stirring to the molten paraffin at a temperature of 100° C., or thereabouts, in order to insure thorough mixing before the material cools. It should be pointed out that the paraffin should be removed from the source of heat before the addition of the hexamethylenetetramin-sodium peroxid, in order to prevent the danger of ignition and that the operations should be carried out in metal vessels for the same reason. The proportions of the various amounts of hexamethylenetetramin, sodium peroxid and paraffin wax may be changed within certain limits depending upon the speed at which the resulting product is designed to burn. Increasing the proportion of paraffin added, will obviously retard the rate of combustion.

The mixture, while still heated, may be cast into molds and allowed to cool or passed through sieves of various sizes, giving a granular or coarse form with varying diameters of the grains and consequent variation of the rate of combustion of the product. The mixture may also be subjected to pressure, while still warm, and in this condition may be pressed into various forms such as cakes, candles, perforated cakes and perforated candles.

In order to prevent the compound from deteriorating, or as a protection against moisture and other objectionable influences, the granulated form or compressed form may be treated with ceresin, wax or any other hydrocarbons, gums, shellacs, or metals in powder form. The shellacs and gums may be dissolved in ethyl-methyl-ketone, alcohol, amyl-acetate, acetone, or any suitable solvent. The metals are suspended in casein, collodium or varnish solutions, in order to facilitate their application. The compound is then in condition for use, and may be pressed, poured or filled, into suitable containers, such as hollow lead balls, tubes, or other metallic containers.

What I claim is:—

1. An incendiary mixture containing hexamethylenetetramin, sodium peroxid and paraffin.

2. An incendiary mixture containing hexamethylenetetramin, sodium peroxid and a paraffin of high melting point, in proportion 25:50:25.

3. The process of making an incendiary mixture which comprises mixing sodium peroxid with hexamethylenetetramin, allowing the mixture to stand to effect a thorough reaction, and subsequently adding to the mixture paraffin wax heated to a temperature of approximately 100° C.

4. An incendiary mixture containing hexamethylenetetramin and sodium peroxid, both in fine powder form, and paraffin of high melting point.

5. An incendiary mixture containing hexamethylenetetramin and sodium peroxid and paraffin producing upon ignition, a constant heat above 1000° C.

6. An incendiary mixture comprising hexamethylenetetramin, sodium peroxid and paraffin producing upon ignition a long, sharp-pointed yellow flame which revolves upon rising into the air, said incendiary mixture burning without the production of sparks, smoke or slag.

7. An incendiary mixture consisting of hexamethylenetetramin, sodium peroxid and paraffin in coarse powder form.

8. An incendiary mixture consisting of hexamethylenetetramin, sodium peroxid and paraffin, in granulated form.

9. An incendiary mixture consisting of hexamethylenetetramin, sodium peroxid and paraffin in granulated form, said granules being covered with a coating containing shellac.

10. An incendiary mixture consisting of hexamethylenetetramin, sodium peroxid and paraffin in granulated form, said granules being covered with a coating containing shellac and a finely powdered metal.

11. An incendiary mixture comprising hexamethylenetetramin, sodium peroxid and paraffin in granulated form, said granules being covered with a coating containing shellac dissolved in a solvent.

Signed at Washington, District of Columbia, this 15th day of November, 1919.

Dr. WALTER T. SCHEELE.